United States Patent
Wong

(10) Patent No.: US 8,239,420 B1
(45) Date of Patent: Aug. 7, 2012

(54) SYSTEM, METHOD AND COMPUTER PROGRAM PRODUCT FOR LOCKING DATA IN AN ON-DEMAND DATABASE SERVICE

(75) Inventor: Simon Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 813 days.

(21) Appl. No.: 12/166,983

(22) Filed: Jul. 2, 2008

Related U.S. Application Data

(60) Provisional application No. 60/950,837, filed on Jul. 19, 2007.

(51) Int. Cl.
*G06F 17/30* (2006.01)
(52) U.S. Cl. ........................................................ 707/802
(58) Field of Classification Search .................. 709/209; 707/10
See application file for complete search history.

(56) References Cited

U.S. PATENT DOCUMENTS

| | | | |
|---|---|---|---|
| 6,178,439 B1* | 1/2001 | Feit | 709/200 |
| 7,209,929 B2 | 4/2007 | Dominguez, Jr. et al. | 707/103 |
| 2003/0233404 A1 | 12/2003 | Hopkins | 709/203 |
| 2005/0065925 A1 | 3/2005 | Weissman et al. | 707/4 |
| 2005/0223022 A1 | 10/2005 | Weissman et al. | 707/102 |
| 2005/0283478 A1 | 12/2005 | Choi et al. | 707/9 |
| 2006/0206834 A1 | 9/2006 | Fisher et al. | 715/777 |
| 2009/0013011 A1* | 1/2009 | Barker et al. | 707/203 |
| 2009/0049053 A1* | 2/2009 | Barker et al. | 707/10 |

OTHER PUBLICATIONS

U.S. Appl. No. 60/828,192, filed Oct. 4, 2006.
U.S. Appl. No. 10/817,161, filed Apr. 2, 2004.

* cited by examiner

*Primary Examiner* — Sheree Brown
(74) *Attorney, Agent, or Firm* — Zilka-Kotab, PC

(57) ABSTRACT

In accordance with embodiments, there are provided mechanisms and methods for locking data in an on-demand database service. These mechanisms and methods for locking data in an on-demand database service can enable embodiments to prevent race conditions, etc. The ability of embodiments to provide such feature may lead to enhanced data integrity when editing data.

17 Claims, 5 Drawing Sheets

RULE: (1) LOCK PARENT BEFORE CHILDREN (2) FOR OBJECT OF SAME TYPE, ORDER BY ID (3) ORDER PARENTS WHEN THERE ARE >1 PARENTS

* LOCK PARENT WHEN NECESSARY, E.G., WHERE THERE ARE SUMMARY FIELDS

SYSTEM, METHOD AND COMPUTER PROGRAM PRODUCT FOR LOCKING DATA IN AN ON-DEMAND DATABASE SERVICE

CLAIM OF PRIORITY

This application claims the benefit of U.S. Provisional Patent Application 60/950,837 entitled "Method and System for Locking Operations in on Demand Applications," by Simon Wong, filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to editing data in database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to allow users to edit data in the foregoing database frameworks. To date, such data is often locked in the database systems, while a user edits the same. The purpose of such locking is to prevent another user from editing the same data at the same time. Unfortunately, such locking technique exhibits limitations, particularly if the data is being accessed remotely over a long period of time. For instance, if the data is being edited utilizing a web page, any edits may not be returned for a lengthy amount of time. It may thus be unacceptable or problematic for locking such data for such extended periods of time.

BRIEF SUMMARY

In accordance with embodiments, there are provided mechanisms and methods for locking data in an on-demand database service. These mechanisms and methods for locking data in an on-demand database service can enable embodiments to prevent race conditions, etc. The ability of embodiments to provide such feature may lead to enhanced data integrity when editing data.

In an embodiment and by way of example, a method is provided for locking data in an on-demand database service. In use, a page is presented including data to a user over a network, utilizing an on-demand database service. A command is then received from the user to save edits to the data. In response to the command, the data is retrieved from a database of the on-demand database service. Further, the data is locked in the database of the on-demand database service, so that the edits may be applied to the data. Still yet, the data is written with the edits to the database of on-demand database service.

While the present invention is described with reference to an embodiment in which techniques for locking data in an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for locking data in an on-demand database service.

Data is often locked in database systems, while a user edits the same. Unfortunately, such locking technique exhibits limitations, particularly if the data is being accessed remotely over a long period of time. As mentioned earlier, if the data is being edited utilizing a web page that is served, any edits may not be returned for a lengthy amount of time. It may thus be unacceptable or problematic for locking such data for extended periods of time.

Thus, mechanisms and methods are provided herein for locking data in an on-demand database service and can enable embodiments to prevent race conditions, etc. The ability of embodiments to provide such feature may lead to enhanced data integrity when editing data.

Next, mechanisms and methods for locking data in an on-demand database service will be described with reference to exemplary embodiments.

Figure 1:
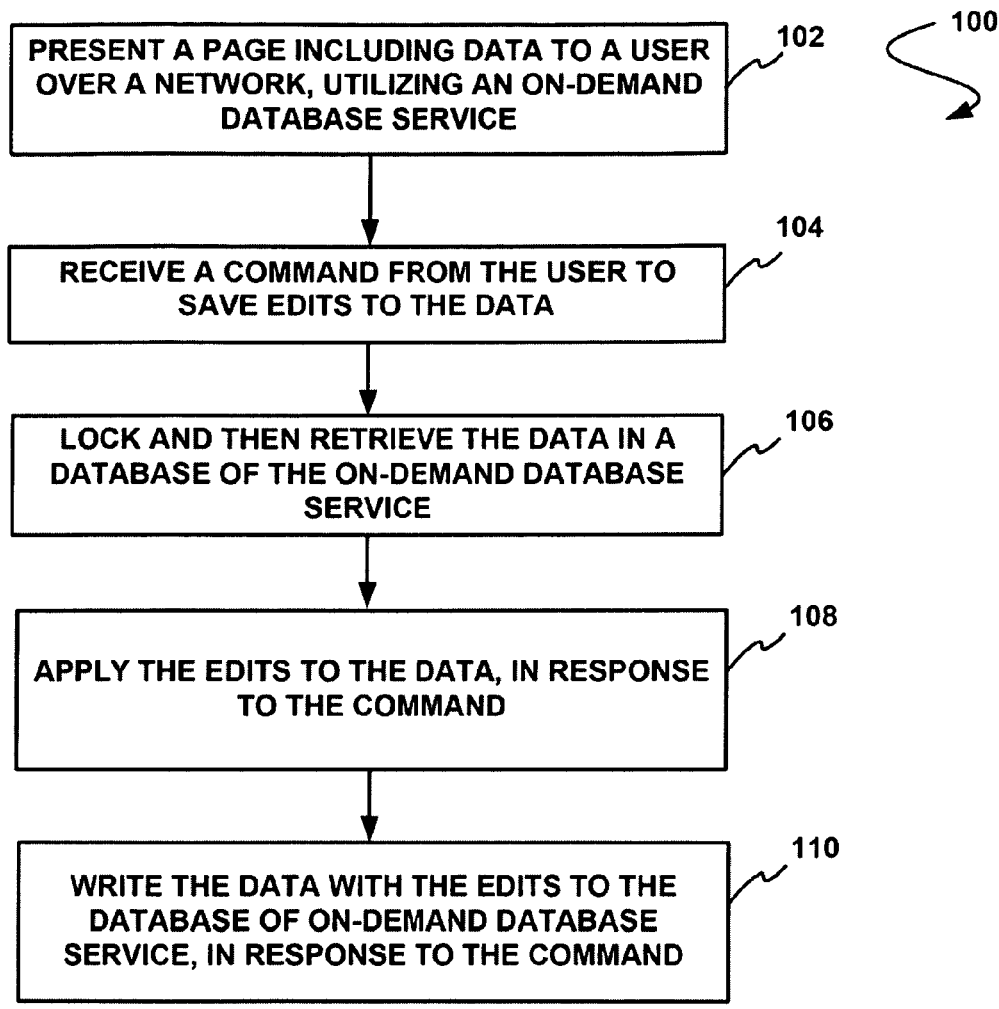
FIG. 1 shows a method for locking data in an on-demand database service, in accordance with one embodiment.

FIG. 1 shows a method 100 for locking data in an on-demand database service, in accordance with one embodiment. As shown, a page including data is presented to a user over a network, utilizing an on-demand database service. See operation 102. In one embodiment, the page may include a webpage that is presented to the user utilizing an on-demand database service.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

As shown further, a command is received from the user to save edits to the data. See operation 104. In the context of the present description, data refers to any data that may be included with a page. For example, in various embodiments, the data may include text, computer code, drawings, images, and/or any other data.

In this case, the edits may include any edits to the data. For example, in one embodiment, the edits may include text edits. In another embodiment, the edits may include the addition and/or deletion of data.

In response to the command to save edits to the data, the data is locked in a database of the on-demand database service, the data is retrieved from a database of the on-demand database service, the edits are applied to the data, and the data with the edits is written to the database of on-demand database service. See operations 106-110.

In the context of the present description, locking data refers to restricting at least one of a write and/or delete access to the data. For example, in one embodiment, the locking may include denying any updates or deletions to the data.

In this way, the data may be locked in the database such that another user cannot modify the data while the edits are applied to the data. On the other hand, while the user is editing the data, data in the on-demand database may remain unlocked such that changes to the data in the database may be made by another user. In one embodiment, the data may include a version identifier that indicates a version of the data.

For example, the data of the page may have a corresponding first version identifier. In this case, the data retrieved from the database may have a corresponding second version identifier. Using these identifiers, the first version identifier and the second identifier may be compared to determine if the versions are the same. Subsequently, the edits may be conditionally applied to the data, based on the comparison.

Figure 2:
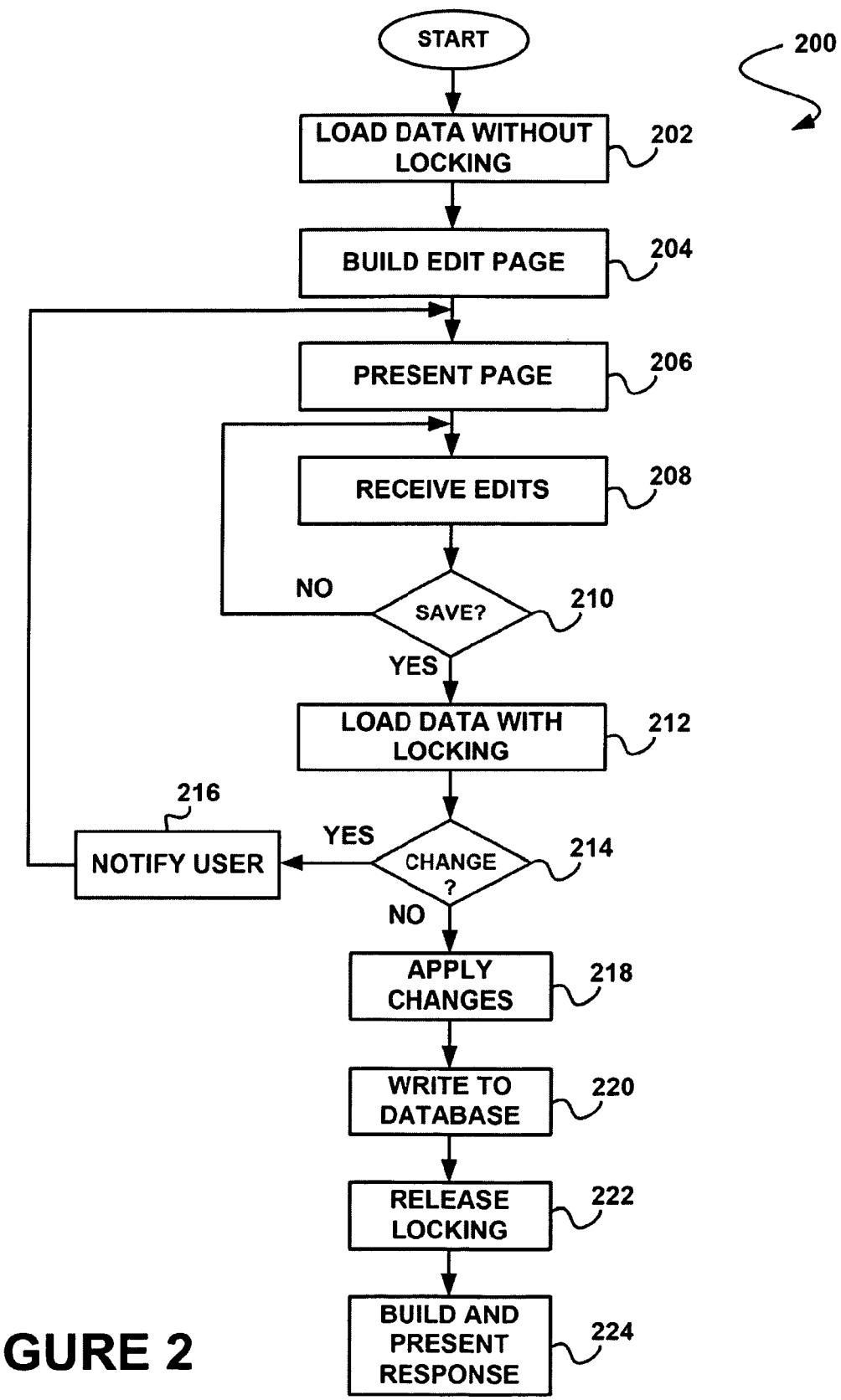
FIG. 2 shows a method for locking data in an on-demand database service, in accordance with another embodiment.

FIG. 2 shows a method 200 for locking data in an on-demand database service, in accordance with another embodiment. As an option, the present method 200 may be implemented in the context of the functionality of FIG. 1. Of course, however, the method 200 may be carried out in any desired environment. The aforementioned definitions may apply during the present description.

As shown, data of an on-demand database is loaded over a network, without locking the data in the on-demand database. See operation 202. In this way, data in the database may remain accessible to authorized users. As an option, the data may be loaded from the on-demand database to local memory and/or a particular instance of the on-demand database.

Once the data is loaded, an edit page is built and presented to a user. See operations 204-206. Once the edit page is presented, the user may be allowed to enter edits into the page.

Any edits made by the user are then received. See operation 208. It is then determined whether the user has elected to save the edits. See operation 210.

If the user has elected to save the edits, the data from the on-demand database is again loaded, but this time the data in the on-demand database is locked. See operation 212. In this case, the data in the on-demand database may be locked such that another user is unable to change or delete the data.

Once the data from the on-demand database is loaded (e.g. into memory), it is determined whether any changes were made to the data in the on-demand database and whether the changes are to be applied to the edited data. See operation 214. In this case, the determination may be made by comparing a version identifier of the recent data loaded from the on-demand database, to a version identifier of the edited data in memory.

The version identifier may include any information capable of being used to identify a version. For example, in one embodiment, the version identifier may include a time stamp. In another embodiment, the version identifier may include a version number.

If it is determined that changes have been made to the recent version loaded from the on-demand database, the user is notified and the edited data including the changes are presented to the user. See operation 216. Once it is determined that no additional changes have been made to the data in the on-demand database, the edited changes are applied to the recent data loaded into memory. See operation 218.

Because the data in the on-demand database has been locked at this point, the edited version of the data in memory is the updated version. This edited version is then written to the on-demand database. See operation 220.

After the data is written, the data in the database is unlocked. See operation 222. As an option, version information (e.g. a version identifier) may also be updated. A response is then built and presented to the user, using the on-demand database service. See operation 224. In this case, the response may include updated version information and/or success verification.

Figure 3:
FIG. 3 shows a table including rules for locking data in an on-demand database service, in accordance with one embodiment.

FIG. 3 shows a table 300 including rules for locking data in an on-demand database service, in accordance with one embodiment. As an option, the present table 300 may be implemented in the context of the functionality of FIGS. 1-2. Of course, however, the table 300 may be implemented in any desired environment. Again, the aforementioned definitions may apply during the present description.

As shown, the table 300 includes a plurality of rules for locking data in an on-demand database service. For example, in one embodiment, the data may be associated with a plurality of objects, where the objects include at least one parent object and at least one child object. In this case, the objects may represent any category of data, where the parent object may represent a category including a plurality of sub-categories represented by child objects.

As an example, the parent object may include an order and the child objects may include items of that order. It should be noted that, although parent objects and child objects are referred to in the present description, such objects may not necessarily represent a first or a sole parent object, or a last or a sole child object. For example, a parent object may be a child of another parent object, and a child object may be the parent of one or more child objects.

Using the rules defined in the table 300, it may be determined whether the parent object associated with data requires locking, and the parent object may be locked if it determined that the parent object requires locking. For example, the parent object may require locking when the parent object includes at least one summary field. The summary field may include any information associated with the object, such as a summary of the object contents, etc. As an option, the parent object may be locked prior to the child object.

Additionally, using the rules defined in the table 300, it may be determined if a plurality of the objects are of a same type. In this case, the plurality of objects may be ordered, if it is determined that the plurality of objects are of the same type. As an option, the ordering may be based on unique identifiers associated with the plurality of objects. As another option, the objects may be ordered in an ascending order.

In this way, deadlocks may be avoided. In one embodiment, object locks may always be acquired in a fixed order. For example, the locking order may include acquiring and locking a parent object first, then child object, and then ordering in ascending primary key order for multiple rows of the same object.

System Overview

Figure 4:
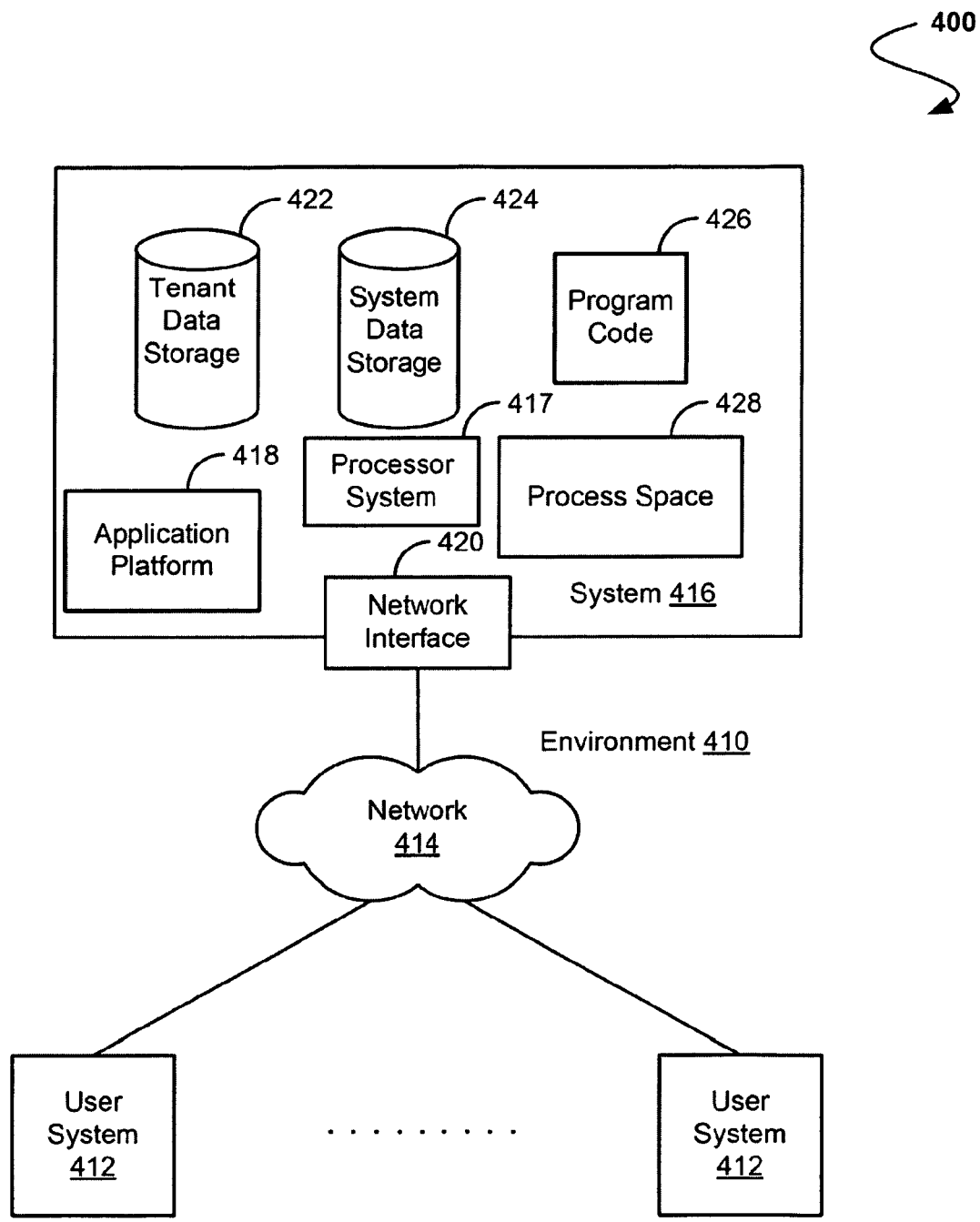
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
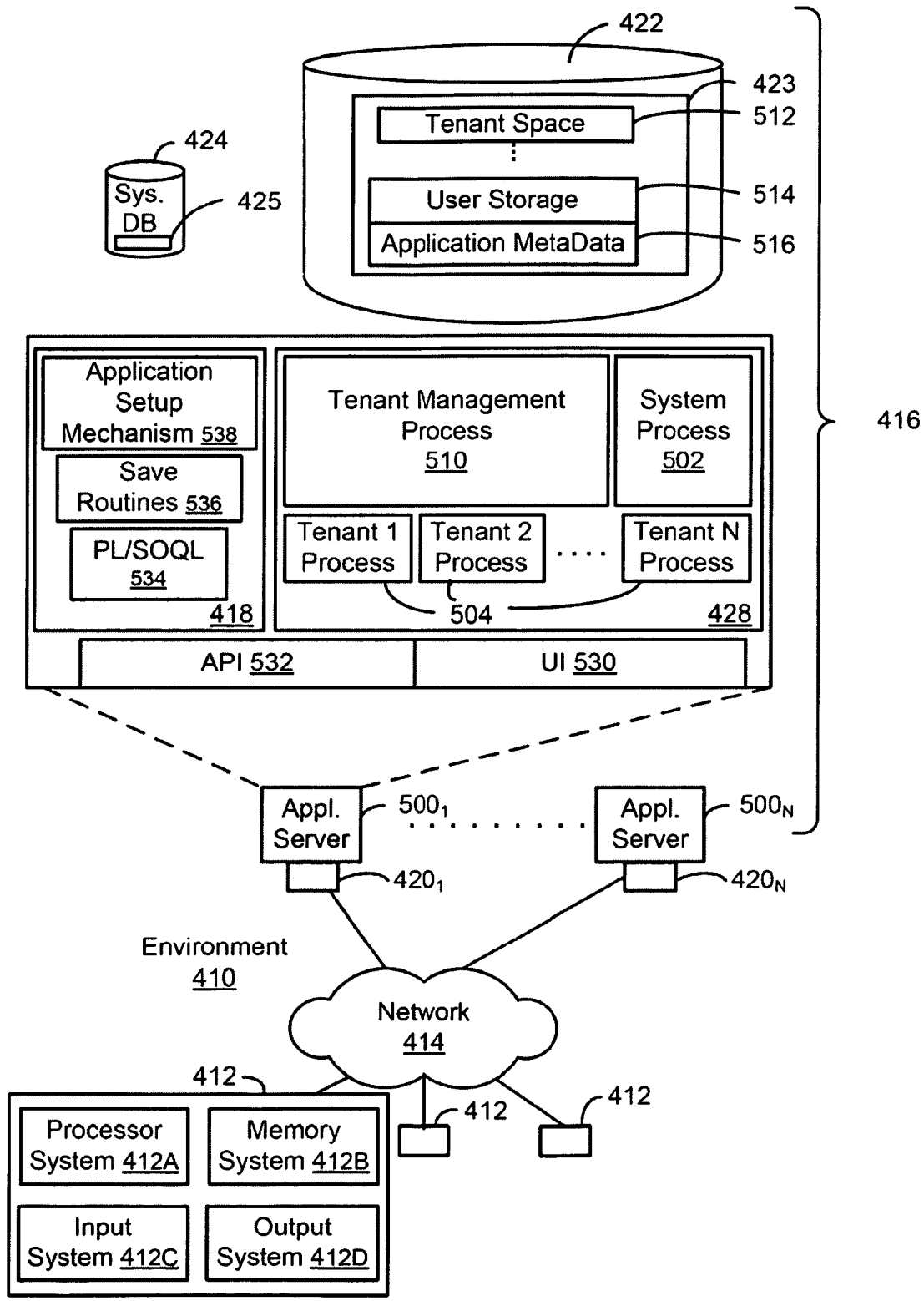
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412E may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 02, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
presenting a page including data to a user over a network, utilizing an on-demand database service wherein the data is associated with a plurality of objects and wherein the objects include at least one parent object and at least one child object;
receiving a command from the user to save edits to the data; and
in response to the command,
locking the data in a database of the on-demand database service, by determining whether the parent object requires locking, and locking the parent object if it determined that the parent object requires locking,
retrieving the data from the database of the on-demand database service,
applying the edits to the data, and
writing the data with the edits to the database of on-demand database service;
wherein the parent object requires locking when the parent object includes at least one summary field;
wherein the parent object is locked prior to the child object.

2. The method of claim 1, wherein the page includes a web page.

3. The method of claim 1, wherein the data of the page has a corresponding first version identifier.

4. The method of claim 3, wherein the data retrieved from the database has a corresponding second version identifier.

5. The method of claim 4, and further comprising comparing the first version identifier and the second identifier.

6. The method of claim 5, wherein the edits are conditionally applied to the data, based on the comparison.

7. The method of claim 1, and further comprising unlocking the data in the database after the data is written.

8. The method of claim 1, wherein the user is allowed to enter edits into the page after being presented.

9. The method of claim 1, wherein the data is associated with a plurality of objects.

10. The method of claim 9, and further comprising determining if the plurality of the objects are of a same type.

11. The method of claim 10, and further comprising ordering the plurality of objects, if it is determined that the plurality of objects are of the same type.

12. The method of claim 11, wherein the ordering is based on unique identifiers associated with the plurality of objects.

13. The method of claim 11, wherein he objects are ordered in an ascending order.

14. The method of claim 1, wherein the on-demand database service includes a multi-tenant on-demand database service.

15. A machine-readable medium carrying one or more sequences of instructions which, when executed by one or more processors, cause the one or more processors to carry out the steps of:
presenting a page including data to a user over a network, utilizing an on-demand database service wherein the data is associated with a plurality of objects and wherein the objects include at least one parent object and at least one child object;
receiving a command from the user to save edits to the data; and
in response to the command, locking the data in a database of the on-demand database service, by determining whether the parent object requires locking, and locking the parent object if it determined that the parent object requires locking, retrieving the data from the database of the on-demand database service, applying the edits to the data, and writing the data with the edits to the database of on-demand database service;

wherein the parent object requires locking when the parent object includes at least one summary field;

wherein the parent object is locked prior to the child object.

16. An apparatus, comprising:

a processor; and one or more stored sequences of instructions which, when executed by the processor, cause the processor to carry out the steps of:

presenting a page including data to a user over a network, utilizing an on-demand database service wherein the data is associated with a plurality of objects and wherein the objects include at least one parent object and at least one child object;

receiving a command from the user to save edits to the data; and in response to the command, locking the data in a database of the on-demand database service, by determining whether the parent object requires locking, and locking the parent object if it determined that the parent object requires locking, retrieving the data from the database of the on-demand database service, applying the edits to the data, and writing the data with the edits to the database of on-demand database service;

wherein the parent object requires locking when the parent object includes at least one summary field;

wherein the parent object is locked prior to the child object.

17. A method for transmitting code for use in a multi-tenant database system on a transmission medium, the method comprising:

transmitting code for presenting a page including data to a user over a network, utilizing an on--demand database service wherein the data is associated with a plurality of objects and wherein the objects include at least one parent object and at least one child object;

transmitting code for receiving a command from the user to save edits to the data: and transmitting code for, in response to the command:

locking the data in a database of the on-demand database service, by determining whether the parent object requires locking, and locking the parent object if it determined that the parent object requires locking, retrieving the data from the database of the on-demand database service, applying the edits to the data, and writing the data with the edits to the database of on-demand database service;

wherein the parent object requires locking when the parent object includes at least one summary field;

wherein the parent object is locked prior to the child object.

* * * * *

UNITED STATES PATENT AND TRADEMARK OFFICE
CERTIFICATE OF CORRECTION

PATENT NO. : 8,239,420 B1  
APPLICATION NO. : 12/166983  
DATED : August 7, 2012  
INVENTOR(S) : Simon Wong Page 1 of 1

It is certified that error appears in the above-identified patent and that said Letters Patent is hereby corrected as shown below:

In the claims:
At col. 12, in claim 13, line 51; please replace "he" with --the--;
At col. 14, in claim 17, line 13; please replace "on--demand" with --on-demand--.

Signed and Sealed this
Eleventh Day of December, 2012

David J. Kappos
*Director of the United States Patent and Trademark Office*